United States Patent
Canossi

(10) Patent No.: US 7,364,422 B2
(45) Date of Patent: Apr. 29, 2008

(54) MOULD DRIVING DEVICE

(75) Inventor: Luca Maria Canossi, Bologna (IT)

(73) Assignee: Automa S.p.A., Crespellano (Bologna) (IT)

( * ) Notice: Subject to any disclaimer, the term of this patent is extended or adjusted under 35 U.S.C. 154(b) by 388 days.

(21) Appl. No.: 11/129,509

(22) Filed: May 16, 2005

(65) Prior Publication Data

US 2005/0260299 A1    Nov. 24, 2005

(30) Foreign Application Priority Data

May 21, 2004   (IT)   ............... BO2004A0328

(51) Int. Cl.
  *B29C 49/56*   (2006.01)
(52) U.S. Cl. ............... 425/541; 425/451.6; 425/451.9
(58) Field of Classification Search ............... 425/541, 425/451.6, 451.9
  See application file for complete search history.

(56) References Cited

U.S. PATENT DOCUMENTS

| | | | |
|---|---|---|---|
| 2,975,473 A | * | 3/1961 | Hagen et al. ............... 264/527 |
| 3,877,861 A | | 4/1975 | Kiefer |
| 5,720,918 A | | 2/1998 | Wollschlager |
| 6,224,367 B1 | | 5/2001 | Maier |
| 6,270,333 B1 | * | 8/2001 | Tamaki et al. ............... 425/149 |
| 2003/0175378 A1 | | 9/2003 | Jandura |

FOREIGN PATENT DOCUMENTS

| | | |
|---|---|---|
| DE | 100 65 547 | 7/2002 |
| JP | 06246806 A | * 9/1994 |

* cited by examiner

*Primary Examiner*—Robert B. Davis
(74) *Attorney, Agent, or Firm*—The Nath Law Group; Jerald L. Meyer; Derek Richmond

(57) ABSTRACT

A driving device for moulds for the production of containers, for example, bottles or the like made of polyethylene, polypropylene or other plastic materials, in which the moulds (2) consist of two half-shells (3) designed to be brought together and pressed against one another along outer profiles (4), has a unit (7) which drives the movement of the half-shells (3), to which an electric main drive and a mechanical auxiliary drive, in particular hydraulic or pneumatic, are connected.

14 Claims, 2 Drawing Sheets

MOULD DRIVING DEVICE

BACKGROUND OF THE INVENTION

The present invention relates to a mould driving device.

The following description makes specific reference, although without limiting the scope of the invention, to moulds for the production of containers such as bottles or the like made of polyethylene, polypropylene or other plastic materials.

In general, production of the above-mentioned type of containers involves the extrusion of a continuous cylindrical tube of plastic material towards a forming station housing a mould designed to give the containers the required shape. Moulding is performed by closing a piece of tube between two half-shells of the mould and, on one hand, seals the tube along the profiles of the half-shells and, on the other, cuts off the excess material, again along the profiles of the half-shells, which, in this way, act as compression cutting edges. Depending on the material used and the length of the cutting line, the forces to be applied in order to close the half-shells vary from several tons to several tens of tons.

Traditionally, amongst mould driving devices, such forces are guaranteed directly, or by means of linkages, by double-acting hydraulic cylinders with maximum operating pressures normally of between 100 and 200 atmospheres.

As well as guaranteeing the high closing forces required, mould driving devices must guarantee mould closing in two separate steps, specifically in a step in which the half-shells rapidly approach one another, braking when they reach the final stretch of the stroke, with subsequent slow contact between the two half-shells for the sealing, and a rapid closing step for the half-shells, commonly known as bumping, to cut off waste with impulsive compression.

For this reason, the mould driving device hydraulic cylinders are supplied by relatively complex hydraulic circuits.

Driving devices with hydraulic cylinders are very inefficient, and therefore require quite a lot of energy in order to operate. Moreover, they are noisy, they need extra energy to cool the oil which, during the compression steps, tends to overheat, and they are dangerously polluting due to the large quantity of oil they require in their supply circuits.

SUMMARY OF THE INVENTION

One aim of the present invention is to provide a mould driving device which is efficient both in its half-mould approach and contact step and in its bumping step.

Another aim of the present invention is to provide a mould driving device with relatively quiet operation.

A further aim of the present invention is to provide a mould driving device which is relatively environmentally friendly.

According to one aspect of it, the present invention provides a mould driving device as described in claim 1.

The dependent claims refer to preferred, advantageous embodiments of the invention.

BRIEF DESCRIPTION OF THE DRAWINGS

Preferred embodiments of the invention will now be described, without restricting the scope of the inventive concept, with reference to the accompanying drawings in which.

DESCRIPTION OF THE PREFERRED EMBODIMENTS

Figure 1:
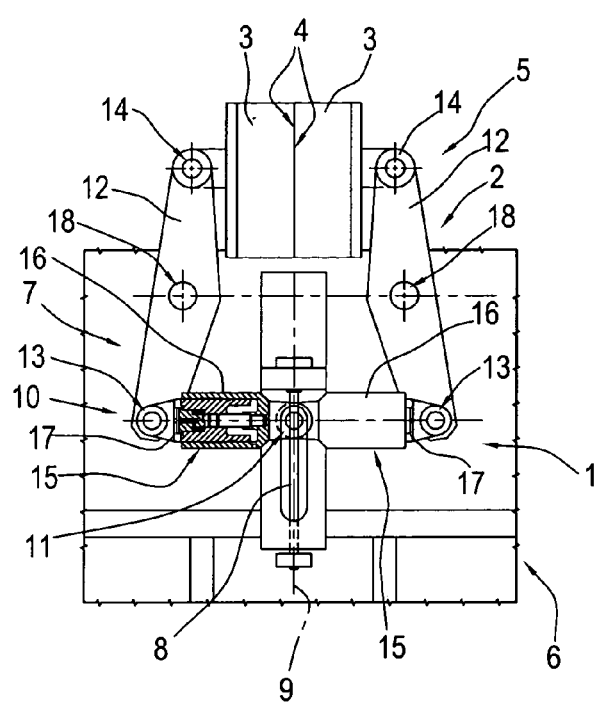
FIG. 1 is a front view of a mould to which a closing device made according to the present invention is attached, in which the mould and the device are illustrated in their closed position.

With reference to FIG. 1, the numeral 1 denotes as a whole a driving device for a mould 2 for the production of containers (not illustrated) such as bottles or the like made of polyethylene, polypropylene or other plastic materials.

The mould 2 consists of two half-shells 3, which have the same outer profile 4, shaped according to the shape to be given to the above-mentioned containers.

As is known and not illustrated, the production of containers involves extrusion of a continuous cylindrical tube of plastic material towards a forming station 5 housing the mould 2. Moulding is performed by closing a piece of tube between the two half-shells 3 of the mould 2 and, on one hand, seals the tube along the profiles 4 of the half-shells 3 and, on the other, cuts off the excess material, again along the profiles 4 of the half-shells 3, which in this way act as compression cutting edges. During tube sealing and cutting, there is a tube blowing step whilst the profiles 4 fit together perfectly.

In the forming process described, the function of the device 1 is to move the half-shells 3 cyclically away from and towards one another and to clamp them together to perform the above-mentioned sealing and cutting steps.

The device 1 comprises a frame 6 supporting a unit 7 for driving the movement of the half-shells 3.

The unit 7 comprises a recirculating ball screw 8, rotatably supported by the frame 6 in such a way that it can rotate about its vertical central axis 9, a toggle 10, having a central joint 11 connected like a lead nut to the screw 8 so that it slides along the axis 9 following rotation of the screw 8, and two rocker arms 12, each hinged at its lower and upper ends to the toggle 10 and, respectively, to a half-shell 3. Specifically, each rocker arm 12 is hinged to the toggle 10 and to the relative half-shell 3 by hinges 13 and 14, both having a horizontal axis.

The toggle 10 consists of two arms formed by respective opposite hydraulic cylinders 15 with a short stroke, in particular 5 mm, whose outer bodies 16 are hinged to the joint 11 and whose inner rods 17 are each hinged to a respective rocker arm 12 by one of the above-mentioned hinges 13.

Each rocker arm 12 also pivots on the frame 6 at the former's central portion by means of a hinge 18, also having a horizontal axis.

Figure 2:
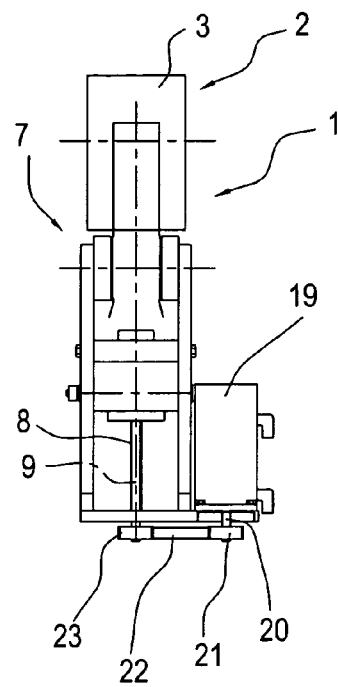
FIG. 2 is a side view of the mould and the closing device illustrated in FIG. 1.

As illustrated in FIG. 2, the frame 6 also supports an inverter-controlled reversible electric motor 19 whose output shaft 20 has a pinion 21 keyed to it, which is connected, by a toothed belt 22, to a pinion 23 fixed below and coaxially with the screw 8.

Figure 3:
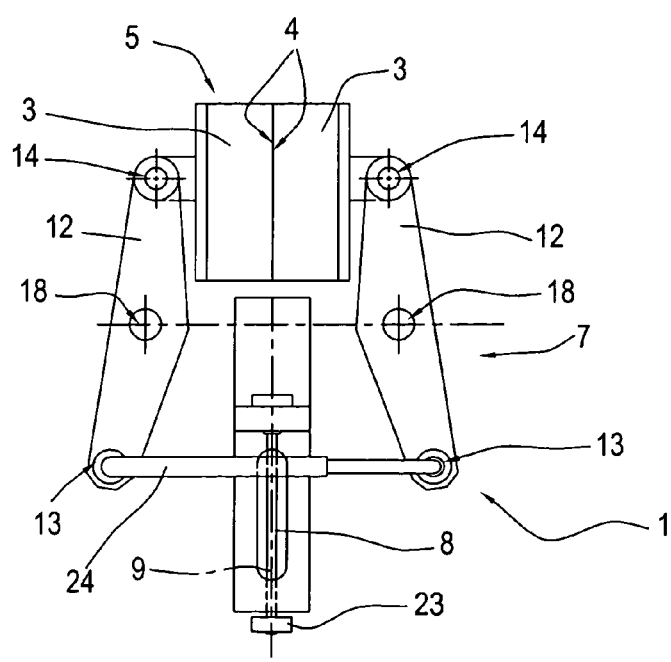
FIG. 3 is a rear view of the mould and the closing device illustrated in FIG. 1.
Figure 4:
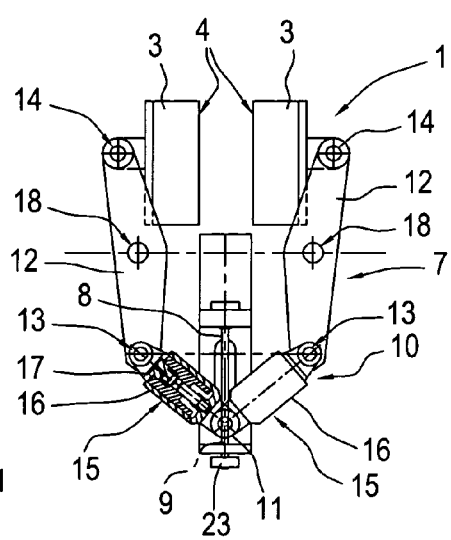
FIG. 4 is a front view of the mould and the closing device made according to the present invention, in which the mould and the device are illustrated in their open position.

In addition to the drive unit 7 and the motor 18, the device 1 comprises a piston pump 24, which, as illustrated in FIG. 3, has its ends hinged to the toggle 10 and to the rocker arms 12 by the above-mentioned hinges 13.

Figure 5:
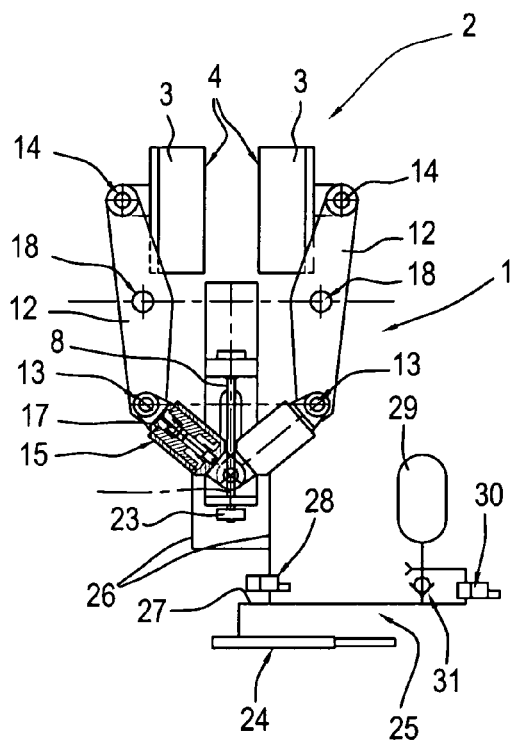
FIG. 5 is a schematic illustration of a hydraulic circuit which is part of the closing device made according to the present invention, in which the state of the circuit corresponds to the device open position illustrated in FIG. 4.

As illustrated in FIG. 5, the pump 24 is part of a closed and sealed hydraulic circuit 25 containing oil or, alternatively, any other fluid suitable for the purpose.

The circuit 25 also includes the inner chambers of the cylinders 15, which communicate with one another via a manifold 26, in turn connected to a pump 24 input/output pipe 27 by a solenoid valve 28.

The pipe 27 is also connected to an accumulator 29 by another solenoid valve 30 to which a non-return valve 31 is connected in parallel. The accumulator 29 is of the bladder type and contains, on one side the oil, and, on the other, nitrogen, with a precharge pressure of between 50 and 100 bar, preferably 70 bar, which is substantially the pressure inside the circuit 25.

The following is a brief description of device 1 operation starting with the configuration, illustrated in FIG. 5, in which the half-shells 3 are opposite one another and at the maximum distance from one another, the joint 11 is in its lower limit position, the pump 24 is discharged, the cylinder 15 chambers are full of oil, the accumulator 29 is charged, the solenoid valve 28 is closed and the solenoid valve 30 is open.

The subsequent rotation of the screw 8 imparted by rotation of the electric motor 19 shaft 20 in a predetermined direction raises the joint 11 along the screw 8, causes opposite rotation of the cylinders 15 about the joint 11, opposite rotation of the rocker arms 12 about the hinges 18 and causes the half-shells 3 to move towards one another.

The electric motor 19 keeps operating until the joint 11 reaches the upper limit position, corresponding to reciprocal alignment of the axes of the cylinders 15 and maximum pump 24 expansion.

Simultaneously with the start of the electric motor 19, the solenoid valve 28 is opened and the solenoid valve 30 is closed. For the entire period during which the electric motor 19 continues to operate, the solenoid valves 28 and 30 are kept, respectively, open and closed.

During said step involving movement of the half-shells 3 towards one another, the pump 24 expands and draws the oil contained in the toggle 10 cylinders 15 through the solenoid valve 28.

Figure 6:
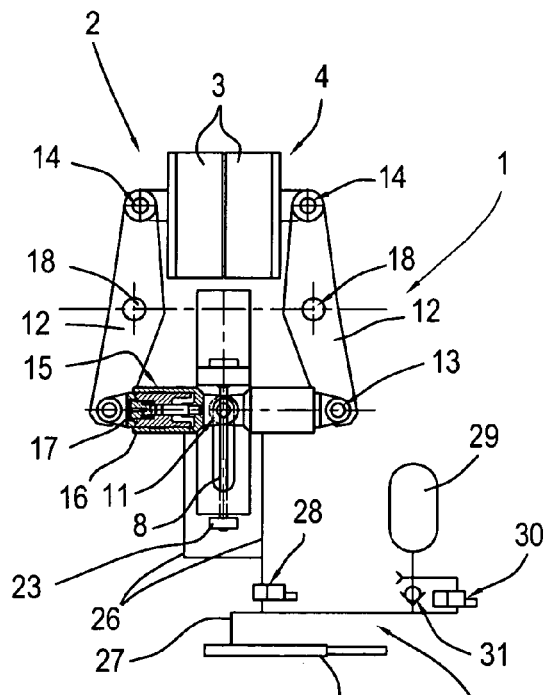
FIG. 6 is a schematic illustration of the hydraulic circuit illustrated in FIG. 5, in which the state of the circuit corresponds to a substantially closed intermediate position of the device made according to the present invention.

When the device 1 reaches the toggle 10 aligned configuration, that is to say, with reciprocal alignment of the axes of the cylinders 15, the electric motor 19 stops. In this configuration, illustrated in FIG. 6, the half-shells 3 are almost in contact with one another but are still separated since the toggle 10 cylinders 15, from which the pump 24 previously drew most of the oil, are at the back end of their stroke.

In this step the half-shells 3 seal the containers.

Figure 7:
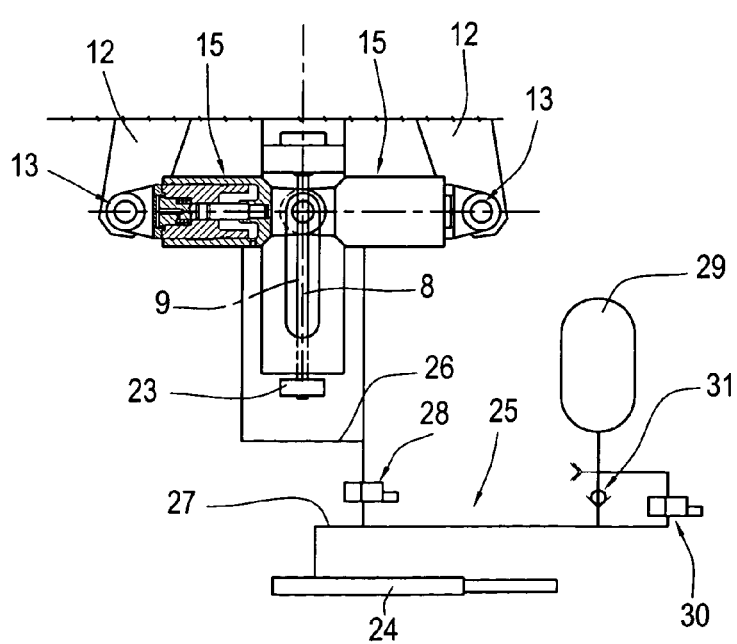
FIG. 7 is a schematic illustration of the hydraulic circuit illustrated in FIG. 5, in which the state of the circuit corresponds to the closed position of the device made according to the present invention.

During the next step, while the electric motor 19 and the screw 8 remain stationary, the solenoid valve 30 is also opened (FIG. 7) and the pressurized oil in the charged accumulator 29 is sent to the cylinders 15, which complete their short stroke definitively closing the moulds with a force equivalent to the product of their section multiplied by the pressure in the circuit.

This sudden, substantially impulsive movement called bumping allows the waste from container shaping to be cut off.

During the subsequent cycle, the electric motor 19 is restarted in the opposite direction of rotation and inverted rotation of the screw 8 lowers the joint 11 along the screw 8, causing inverted opposite rotation of the cylinders 15 about the joint 11, inverted opposite rotation of the rocker arms 12 about the hinges 18, movement of the half-shells 3 away from one another and contraction of the pump 24.

Simultaneously with restarting of the electric motor 19, the solenoid valve 28 is closed and the solenoid valve 30 is kept opened. For the entire period during which the electric motor 19 continues its inverted rotation, the solenoid valves 28 and 30 are kept, respectively, closed and open.

During the above-mentioned step in which the half-shells 3 move away from one another, the pump 24 transfers the oil it contains to the accumulator 29, charging the latter.

It should be noticed that the volume of oil contained in the piston pump 24 is equivalent to that required to make the two cylinders 15 perform the mould 2 closing movement with the maximum force.

When the start of cycle configuration is reached, illustrated in FIG. 5, in which the half-shells 3 are again opposite and at the maximum distance from one another, the joint 11 is again in its lower limit position, the pump 24 is discharged, the cylinder 15 chambers are full of oil and the accumulator 29 is charged, the electric motor 19 is stopped and then started again with the original direction of rotation to repeat the cycle.

It should also be noticed that, during operation of the device 1, the circuit 25 is affected by a cyclical movement of oil, involving a relatively small quantity strictly necessary for performing the bumping step, from the cylinders 15 to the pump 24, from the accumulator 29 to the cylinder 15 and finally from the pump 24 to the accumulator 29. The significant closing force required during the bumping step is therefore hydraulically guaranteed by the circuit 25 thanks to a small quantity of oil, around one liter, with evident advantages in terms of costs and pollution, whilst the remaining steps of the mould 2 closing cycle, which constitute most of the cycle, are guaranteed by electric operation of the toggle 10, with relatively low power required from the motor 19, a high energy yield and very low level of noise emissions.

The bumping stroke may also be electronically regulated by modifying the opening and closing times of the solenoid valves 28 and 30 so as to vary the volume of oil cyclically transferred in the circuit 25. In this way, the mould 2 closing force can be adapted to the material used for production of the containers, to the thickness of the extruded tube and to the length of the cutting line deriving from the desired shape for the containers.

In an embodiment not illustrated, but easily inferred from the above description, the circuit 25 may be substituted by a pneumatic circuit similar to the circuit 25 but containing compressed air, or any other gas, in place of a fluid, for example, oil. In this case, similarly to what is described above, the pneumatic circuit would be affected by the cyclical transfer of compressed air, in a low quantity strictly necessary for performing the bumping step, from the cylinders 15 to the pump 24, from the accumulator 29 to the cylinders 15 and finally from the pump 24 to the accumulator 29.

More generally, the device 1 comprise a main drive and an auxiliary drive for the unit 7 which drives the movement of the half-shells 3, in which the main drive is electric and the auxiliary drive is mechanical, in particular hydraulic or pneumatic.

According to another embodiment, not illustrated but easily inferred from the above description, one of the two cylinders 15 of the toggle 10 may be substituted with a passive lever.

The invention can be modified and adapted in several ways without thereby departing from the scope of the inventive concept described in the claims herein.

LIST OF REFERENCE CHARACTERS

1 Driving device
2 Mould
3 Half-shells
4 Profiles
5 Forming station
6 Frame
7 Drive unit
8 Screw
9 Axis
10 Toggle
11 Joint
12 Rocker arms
13 Hinges
14 Hinges
15 Cylinders
16 Bodies of cylinders 15
17 Rods of cylinders 15
18 Hinge
19 Electric motor
20 Shaft
21 Pinion
22 Belt
23 Pinion
24 Pump
25 Circuit
26 Manifold
27 Pipe
28 Solenoid valve
29 Accumulator
30 Solenoid valve
31 Valve

What is claimed is:

1. A driving device for moulds for the production of containers, for example, bottles or the like made of polyethylene, polypropylene or other plastic materials; the moulds (2) consisting of two half-shells (3) designed to be brought together and pressed against one another along outer profiles (4); the device (1) comprising a unit (7) which drives the movement of the half-shells (3); the device (1) further comprising a main drive and an auxiliary drive for the drive unit (7), in which the main drive is electric and the auxiliary drive is mechanical, the main drive comprising an electric motor (19) operating two rocker arms (12) connecting the half-shells (3) with two respective arms (15), at least one of which consists of an actuator cylinder; both arms being hinged on one side to a joint (11) and on the other side to a respective rocker arm (12).

2. The device according to claim 1, wherein the main drive further comprises a screw (8) designed to rotate about its own central axis (9) driven by the electric motor (19) and a toggle (10) connected to the screw (8) in such a way that it slides along the central axis (9) following rotation of the screw (8), said rocker arms (12) connecting the toggle (10) to the half-shells (3).

3. The device according to claim 2, wherein the toggle (10) comprises a joint (11) connected to the screw (8) in such a way that it slides along the central axis (9) following rotation of the screw.

4. The device according to claim 3, wherein the arms consist of actuator cylinders (15) set (15) comprising an outer body (16), hinged to the joint (11), and an inner rod (17), hinged to a rocker arm (12).

5. The device according to claim 3, wherein the actuator cylinders (15) are part of the auxiliary drive.

6. The device according to claim 5, wherein the auxiliary drive also comprises a piston pump opposite one another; each actuator cylinder (24), hinged at its ends to the ends of the arms (15) opposite the joint (11).

7. The device according to claim 6, wherein the auxiliary drive also comprises a manifold (26) inserted between the inner chambers of the actuator cylinders (15) and a pump (24) input/output pipe (27).

8. The device according to claim 7, wherein the manifold (26) is connected to the pump (24) input/output pipe (27) by a first solenoid valve (28).

9. The device according to claim 8, wherein the auxiliary drive comprises a precharged accumulator (29), connected to the pump (24) input/output pipe (27) by a second solenoid valve (30).

10. The device according to claim 9, wherein the auxiliary drive comprises a closed and sealed hydraulic or pneumatic circuit (25) containing a fluid or a gas and at least partly consisting of the actuator cylinders (15), the piston pump (24), the manifold (26), the pump (24) input/output pipe (27), the first and the second solenoid valves (28, 30) and the precharged accumulator (29).

11. The device according to claim 10, wherein the accumulator (29) is of the bladder type and contains on one side a fluid and on the other side a gas, in particular nitrogen, with a predetermined precharge pressure.

12. The device according to claim 11, wherein the predetermined precharge pressure is between 50 and 100 bar.

13. The device according to claim 10, wherein the fluid is oil.

14. The device according to claim 10, wherein the hydraulic or pneumatic circuit (25) is affected by a cyclical transfer of fluid or gas, in a quantity strictly necessary for performing a half-shell (3) bumping step, from the actuator cylinders (15) to the pump (24), from the accumulator (29) to the actuator cylinders (15) and from the pump (24) to the accumulator (29).

* * * * *